(12) United States Patent
Hentschke

(10) Patent No.: US 6,212,007 B1
(45) Date of Patent: Apr. 3, 2001

(54) 3D-DISPLAY INCLUDING CYLINDRICAL LENSES AND BINARY CODED MICRO-FIELDS

(76) Inventor: Siegbert Hentschke, Wilhelmshoeher Allee 71, D-34121 Kassel (DE)

(*) Notice: Subject to any disclaimer, the term of this patent is extended or adjusted under 35 U.S.C. 154(b) by 0 days.

(21) Appl. No.: 09/297,713
(22) PCT Filed: Nov. 5, 1997
(86) PCT No.: PCT/DE97/02625
  § 371 Date: Jul. 12, 1999
  § 102(e) Date: Jul. 12, 1999
(87) PCT Pub. No.: WO98/21619
  PCT Pub. Date: May 22, 1998

(30) Foreign Application Priority Data
Nov. 8, 1996 (DE) ............................................. 196 46 046

(51) Int. Cl.[7] ............................. G02B 27/22; G02B 27/26
(52) U.S. Cl. ............................................ 359/463; 359/465
(58) Field of Search ................................ 359/463, 464, 359/465, 619, 23

(56) References Cited

U.S. PATENT DOCUMENTS

| 3,161,509 | * | 12/1964 | Howe et al. | 359/464 |
| 3,582,984 | * | 6/1971 | Kurokawa | 359/569 |
| 5,629,797 | * | 5/1997 | Ridgway | 359/462 |
| 5,850,269 | * | 12/1998 | Kim | 359/463 |

FOREIGN PATENT DOCUMENTS

| 39 21 061 A1 | 1/1991 | (DE) . |
| 41 14 023 A1 | 11/1992 | (DE) . |
| 195 00 315 C1 | 10/1995 | (DE) . |
| 0 332 268 A1 | 9/1989 | (EP) . |
| WO 92/22989 | 12/1992 | (WO) . |

OTHER PUBLICATIONS

Boener: "Autosterescopic 3–D Imaging by Front and Rear Projection . . . ", Displays, vol. 14, No. 1, 1993.
A. Tschudi, M. Kreuzer: "Laseradresseirtes Projektionsdisplay", CeBIT Brochure Hessischer Hochschulen 1995.
H. P. Mainzer, et al: "The Heidelberg Ray Tracing Model", IEEE Computer Graphics and App. Nov. 1991, pp. 34–43.
S Hentschke, et al: Personenadaptive Stereoskope Bildverarbeitung, CeBIT–Exponat, Brochure Hessischer Hochschulen, 1995.
R. Boener: "Autostereskopische Rueckprojektions–und Flachbildschirme", Fernseh und Kinorechnik vol. 48, No. 11 (1994), pp. 594–600.
S Hentschke : "Personenadaptiver Autostereoskoper Monitor . . . ", Fernsehe–und Kinotechnische Zeitschrift No. 5/1996, pp. 242–248.
M Kreuzer, et al: "New Liquid Crystal Display With Bistability . . . ", Appl. Phys. Letters 62, pp. 1712–1714, 1993.

* cited by examiner

Primary Examiner—Jon Henry
(74) Attorney, Agent, or Firm—Michael J. Striker

(57) ABSTRACT

A high resolution 3D color display, particularly suited to natural three-dimensional representation in computer tomography, is diclosed. In a digital autostereoscopic display, over eighty related or desired perspective views of an object may be represented in 3D, written onto a digital display by lasers in a few minutes, and subsequently deleted. The displays are digitally stored in minute fields of a thin LC layer of a scatter screen and converted into high resolution color pictures by reverse irradiation view color and brightness masks. The individual perspectives may be viewed selectively by a lenticular screen plate. The same displays may also be stored in the same code on a film which, when used in place of the scatter screen, shows the display to a user. The display can therefore be used in modified form to produce display photos when graphic computers are used.

8 Claims, 4 Drawing Sheets

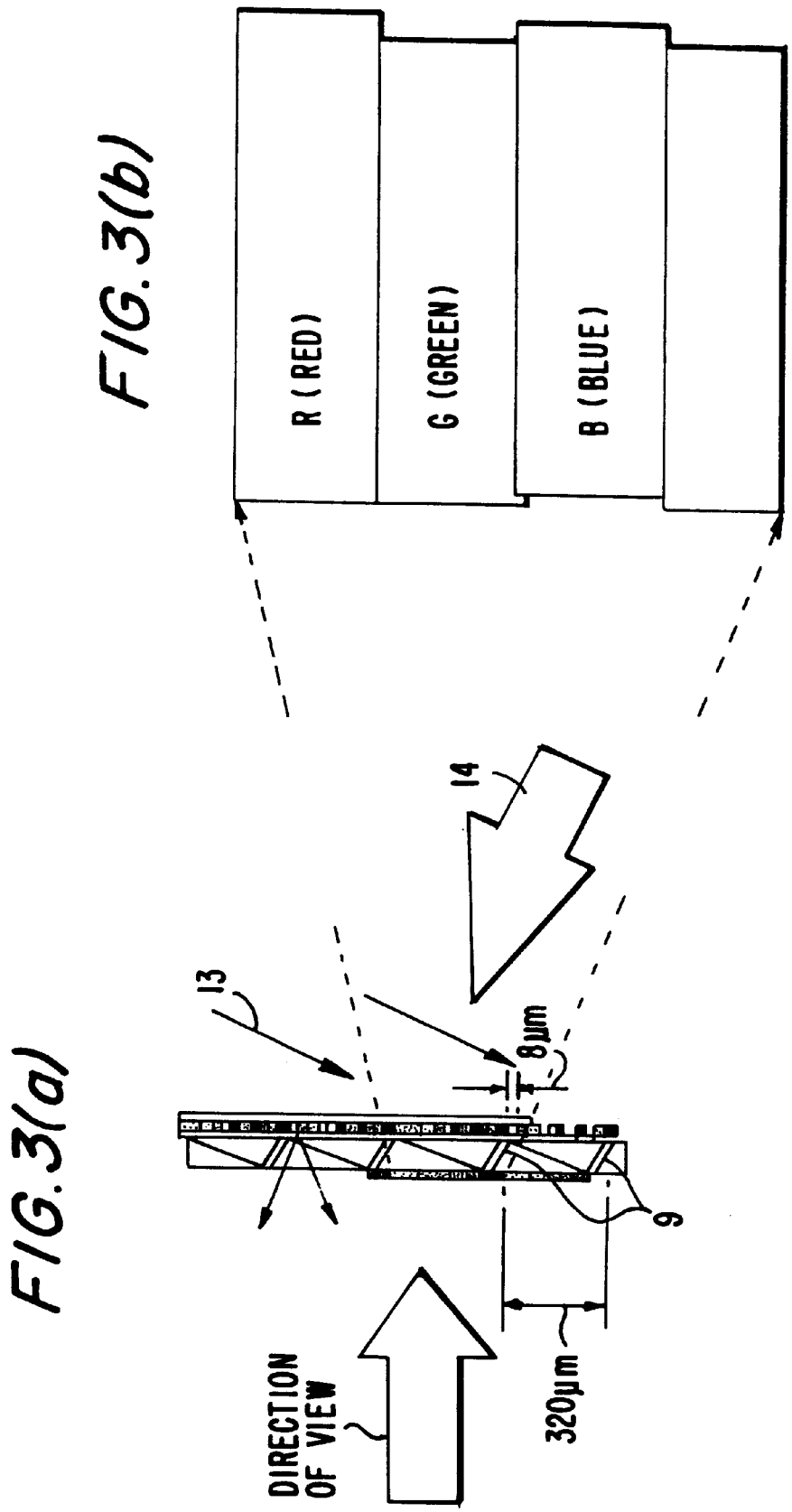

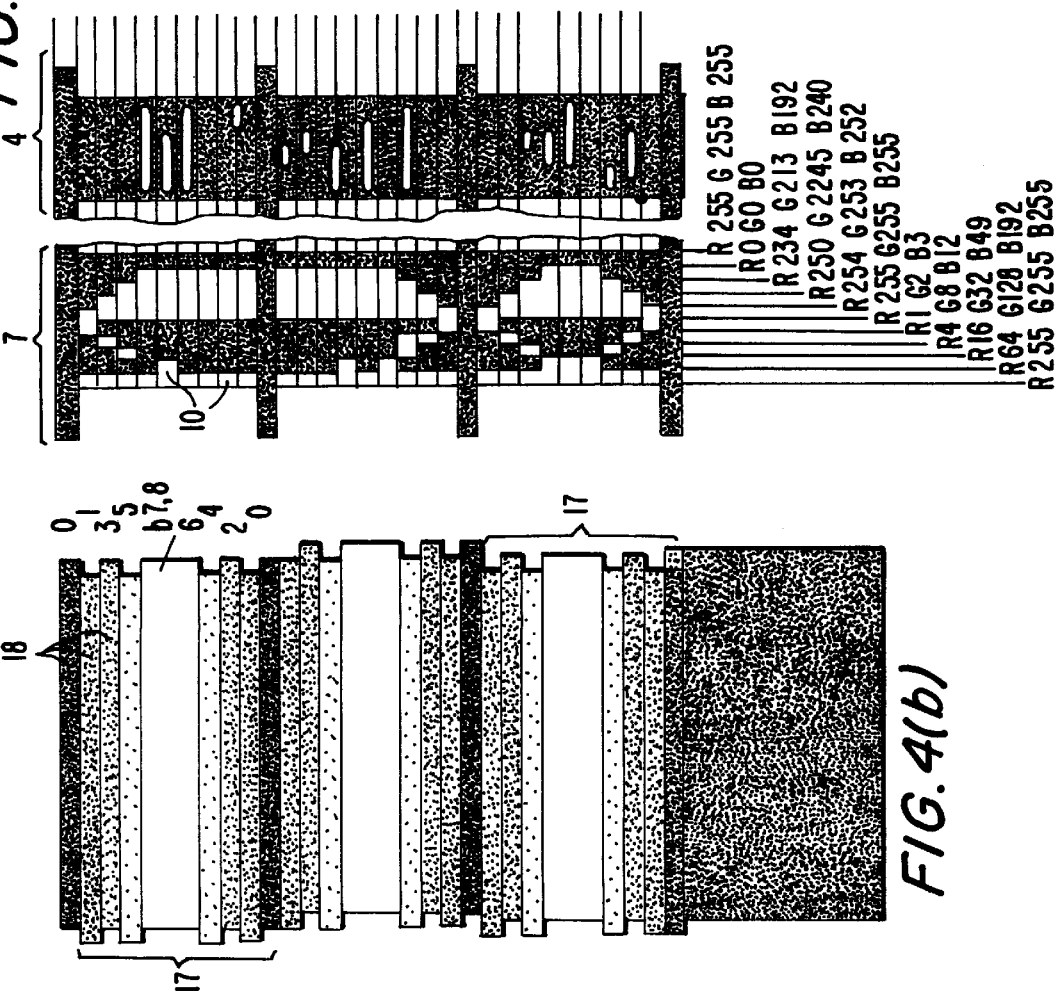

3D-DISPLAY INCLUDING CYLINDRICAL LENSES AND BINARY CODED MICRO-FIELDS

The invention relates to an auto-stereoscopic display screen for several viewers, which can show a plurality of perspectives of an article at the same time and is accordingly called a "stereo-hologram display". Such an auto-stereoscopic display or in other words 3-D display screen is known from the patent specification [1] which, however, in contrast to the invention described here can only show two perspectives of an article at the same time. This invention is based on the object of ensuring an auto-stereoscopic representation which does not relate only to one viewer position but to a whole range of viewer positions, from which a represented article can be observed true to nature, in three dimensions; several viewers can thus perceive the represented article three-dimensionally at the same time. This object is met by the characterizing features in claim 1. The plurality of perspectives of an article here required to be displayed are obtained through an arrangement, in which a black and white micro display (or even a photo mask) is located in the vertical focal lines of a lens raster plate, on which display (or mask) the many different views of an article can be represented interleaved with each other in the narrowest of strips. The different grey and colour values are then achieved by fixedly arranged colour and brightness masks located therebetween.

The invention relates to 3-dimensional, hologram-like colour picture displays and processing in which a plurality of stereoscopic views of an object can be displayed in dependence on the position of an viewer. The viewer standing in front of the stereo-hologram display can view a displayed article from several perspectives by lateral movements of the head—within a previously selectable "round view". In particular this high resolution display is suitable for radiology in computer tomography for medical technology, in which arises the ability to be able to perceive the third dimension of depth without additional auxiliary means (e.g. glasses). The colour hologram computed by a computer can be written by means of modulated laser beams within a few minutes on a digital display and archived on an inexpensive black and white photo of like size. Alternatively however, only this black and white photo mask can be produced and be placed behind a display attachment, so that the same stereo hologram is visible. In the representation of objects it is not necessary to restrict oneself to external views. For example the presence of a three-dimensional tissue description from nuclear spin tomography allows internal and external views (e.g. of a kidney) to be combined and represented one after the other on a stereo-hologram.

STATE OF THE ART

Stereoscopic film and projection methods have been used for years. Polarised light (horizontal, vertical, circular) is used mostly, in order to separate the left and right images [10]. With advances in LCD technology it has become possible to control the light transmission coefficient of crystals electronically. This made the development of the shutter technique possible, in which the right and left spectacle glasses become opaque alternately at half the picture frequency and right and left images appear sequentially in synchronism on the display screen [6].

Auto-stereoscopic projections are implemented with the aid of screens with strip lens rasters with several projection directions. The correct perspective image is associated with the corresponding direction [1], [2]. A smooth transition from one perspective to the next can hardly be achieved, since the number of the projection directions cannot be increased arbitrarily. In an auto-stereoscopic display, which is intended for one person only, only two perspectives are used, which require a specific direction of view [7], [8]. To display a fully stereoscopic image as in a hologram is achieved by using "head tracking" sensors, which control on the one hand a high-power real-time computer to calculate the matching stereoscopic image perspectives and on the other hand the auto-stereoscopic screen for the mechanical follow up of the lens raster plate. The precise head position and movement are detected and the associated images are generated simultaneously. Furthermore there are expensive VR systems (virtual reality) using "head mounted displays" which require getting used to.

Nuclear spin resonance and computer tomography are the most important fields of use for stereoscopic 3D visualisations in medical technology. In order to compute specific desired perspectives, high power special computers for "volume tracking algorithms" have been developed [5]. Combined computer visualisations and real-time transmissions from endoscopes are becoming one of the most important neuro-surgical tools. Stereoscopic endoscopes are already in use. Electronic movement control through a "head tracking sensor" operating on an infrared basis is easy to combine with a person-related auto-stereoscopic display screen system.

Prototype auto-stereoscopic image reproduction systems are being developed at the present time in many places. Most of them require high-precision mechanical parts for the movement follow-up with changes in the position of the viewer. However electronic adaptive shutter systems are also known, which require two displays [8], [9].

Holographically stored 3d images have been known for many years, in which the picture information is retained on highest resolution photographic material in the form of wave images. These arise from the superposition of coherent or even monochromatic light which has been reflected from bodies to be recorded. The 3D image can then be made visible again by illumination with coherent light. Unfortunately the colour information is lost.

Displays built on the basis of bistable liquid crystals, which can be written with laser beams, have been known for some years. Liquid crystals can be flipped—by supplying laser power—over regions of some $\mu m^2$ from the transparent state into a dispersive, i.e. scattering state. This state can then be retained for years without supplying laser power or can be reset by application of an electrical voltage [12]. Binary information can thus be stored here. These writeable surfaces will be called scatter displays in the following.

FORMULATION OF THE PROBLEM

The objective is so to store 3-dimensional images that represented bodies appear stereoscopically from different observing positions, moreover with different perspectives. Accordingly a hologram-like change of the represented colour image is to occur with lateral movement of the head of an viewer. The problem formulation which emerges from this, is to create such colour image stereo-holograms with the aid of scatter displays and further special arrangements, so that such a stereo colour hologram can be written with laser beams within an acceptable time. The colour hologram should then be maintained as far as possible without supplying power, or be capable of being reset so that this display can be used again for the next stereo-hologram.

It should moreover be possible to save the same image on a black and white film of normal type on the market. At the same time it should be possible for this film to be so used that a stereo-hologram stored i binary form thereon can be made visible by means of an existing attachment. It would be advantageous if this attachment were identical with that which is required for the scatter display.

Up until now no writable stereo-hologram displays are known which have had the features recited above.

BRIEF DESCRIPTION OF THE DRAWINGS

FIG. 3a is a view showing a vertical section through a scatter display;

FIG. 3b is a view showing an enlarged color structure; and

FIGS. 4a, 4b, 4c, and 4d show a color mask, a brightness mask, an example of digital color pixel coating, and an example of the course of a code pattern from a scatter display, correspondingly.

PRINCIPLE OF THE INVENTION

The performance features of a stereo-hologram display described in the formulation of the problem can be achieved using a cylindrical lens raster glass known from [1], [2], [8], [11], a scatter display known from [4] and [12] and some masking layers yet to be described in more detail, which are assembled in a quite specific way. The display is written by means of parallel laser beams, which are modulated with a suitable code. It is assumed that 3-dimensional object information from NMR (nuclear magnetic resonance) or X-ray tomography is available in a graphic computer. All desired perspective views are then computed from this data—these can certainly be up to 100—each for a specific direction of view, from which the appearance of the object is later to be observed. All these perspectives of the object are then assembled into a complete colour 3D image on the stereo-hologram display, with which the desired perspective can be selected through the direction of observation or head position.

Figure 1:
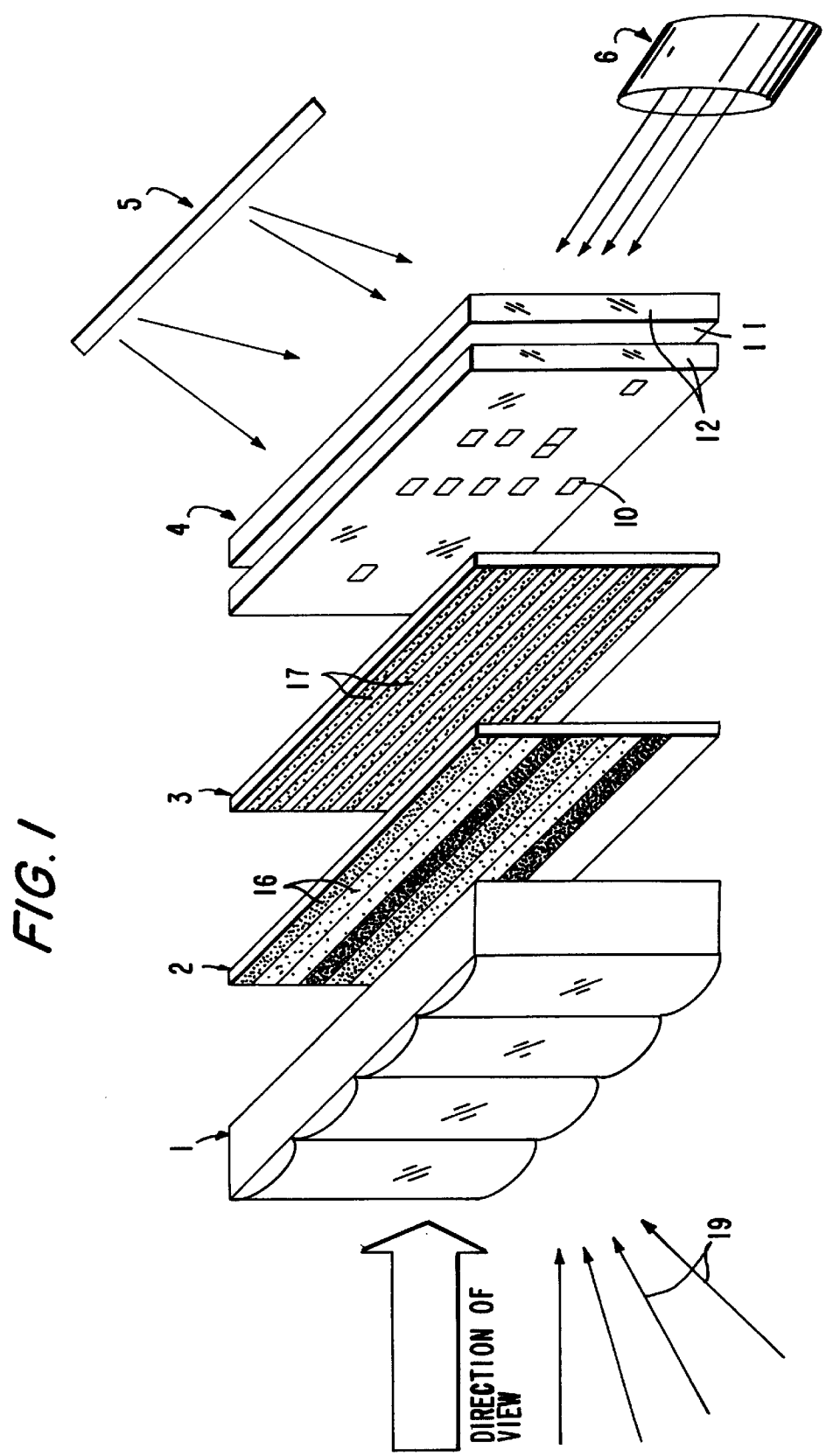
FIG. 1 is a view showing a stereo-hologram display for computer tomography in accordance with the present Invention.

The structure and functioning of this display will now be described in more detail with reference to the drawing in FIG. 1. The diagram shows various layers of the display, which are represented spread out from one another. The front side of the stereo-hologram display consists of a cylindrical lens raster glass (1), with 1024 cylindrical lenses for example at a pitch height of about 0.5 mm, in order to specify one suitable width; (obviously different lens widths are optimal for different observation distances). The lenses focus in relation to the viewing distance a (in the assembled state of the hologram display) in the LC (liquid crystal) layer of the scatter display (4) with a pixel size of 8 $\mu$m×4 $\mu$m, which is formed from liquid crystals (11) between two glass plates (12). In between the scatter display (4) and the lens raster plate (1) there are two masks: a colour mask (2) and a brightness mask (3). The scatter display is illuminated from the rear with white light (5). Laser beams from a controlled laser diode (6) are used to write the scatter display.

Colour and brightness masks are explained fully in FIG. 4: the colour mask has three horizontal, transparent colour filter strips, which allow red (R), green (G) and blue (B) light respectively to pass unchanged and filter out the corresponding complementary components. An option is a black strip of approximately the same width which filters out all light wavelengths. All four or three strips have together a width which corresponds to about a lens width, e.g. 0.5 mm. The colour strip height amounts to about 80 $\mu$m, the vertical pitch height to about 0.32 mm. Behind each colour strip (R, G or B), cf. a) FIG. 4, is located a brightness masking strip, cf. b) FIG. 4. This masking strip is for its part subdivided into further sub-strips, e.g. 10 each with a width of about 8 $\mu$m. In other embodiments with less brightness steps fewer sub-strips, e.g. 8 or 4, could be provided. Each sub-strip has a specific light transmission coefficient (independent of wavelength), which allows as simple as possible binary brightness coding. For example, these sub-strips have the following different classes: 1. the whole amplitude of the light is passed, 2. half the amplitude (½) is passed, 3. a quarter (¼) of the amplitude is passed, 4. an eighth of the amplitude ($\frac{1}{8}=\frac{1}{2}^3$), 5. a sixteenth of the amplitude ($\frac{1}{16}=\frac{1}{2}^4$), ..., up to 8. one hundred and twenty eighth ($\frac{1}{128}=\frac{1}{2}^7$). A sub-strip of transmission coefficient 1 can accordingly have the relative brightness of 64.

Not all transmission coefficient classes have to be present in the sub-strips. For example, the class 8 can be omitted if 3 strips of class 1 are used. 3 strips of class 1 are used in FIG. 4b) and are placed directly next to each other in the middle of a colour strip, so that a sub-strip of class 1 three times wider results. It is possible for example, with these three strips, to create relative brightness values of 0×64, 1×64, 2×64, 3×64, in that the 3 black and white micro-pixels of the display lying behind are suitably controlled. Each micro-pixel of a brightness sub-strip on the display can either scatter light or not. Moreover in the example of FIG. 4b) brightness strips of classes 2 to 7 are used. Through selected control of the 9 micro-pixels of the display lying behind these relative brightness values from 0 to 255 can be created in one colour strip, through their superimposition, corresponding to 8 bit coding.

The use of three adjacent sub-strips of class 1 reduces effective light absorption in the masking strips and increases the lack of sensitivity to a slight height tolerance of the following scatter display, cf. d), FIG. 4. The other narrow strips allow, as already explained, the brightness components of the amplitude through from 50%, 25%, 12.5%, 6.25%, 3.125%, 1.56025% or 0%. Examples of coded brightness steps are given in c), FIG. 4. In detail there are shown in FIGS. 4a) to d): a) colour mask; height of a colour strip about 80 $\mu$m, RGBS pitch height about 320 $\mu$m; b) brightness mask with 7 brightness steps (+black) with 9 colour strips for an 8-bit brightness coding; c) an example of a digital colour pixel coding of a stereo-hologram on a black and white film with indication of the associated brightness values; d) an example of the course of a code pattern from a scatter display which has been written from laser beams.

Other brightness masks can naturally be implemented, which correspond to a smaller number of brightness steps. The opaque black strip is suitably so positioned that it covers the transition from one colour to the next. A size is provided for the whole stereo-hologram display in the envisaged use in medical technology of about 50 cm wide and 28 cm high. That is unusually large for the LC scatter display to be made but are feasible, because narrow opaque horizontal strips must be present, in which wires for resetting electrodes and spacers can be fitted.

Figure 2:
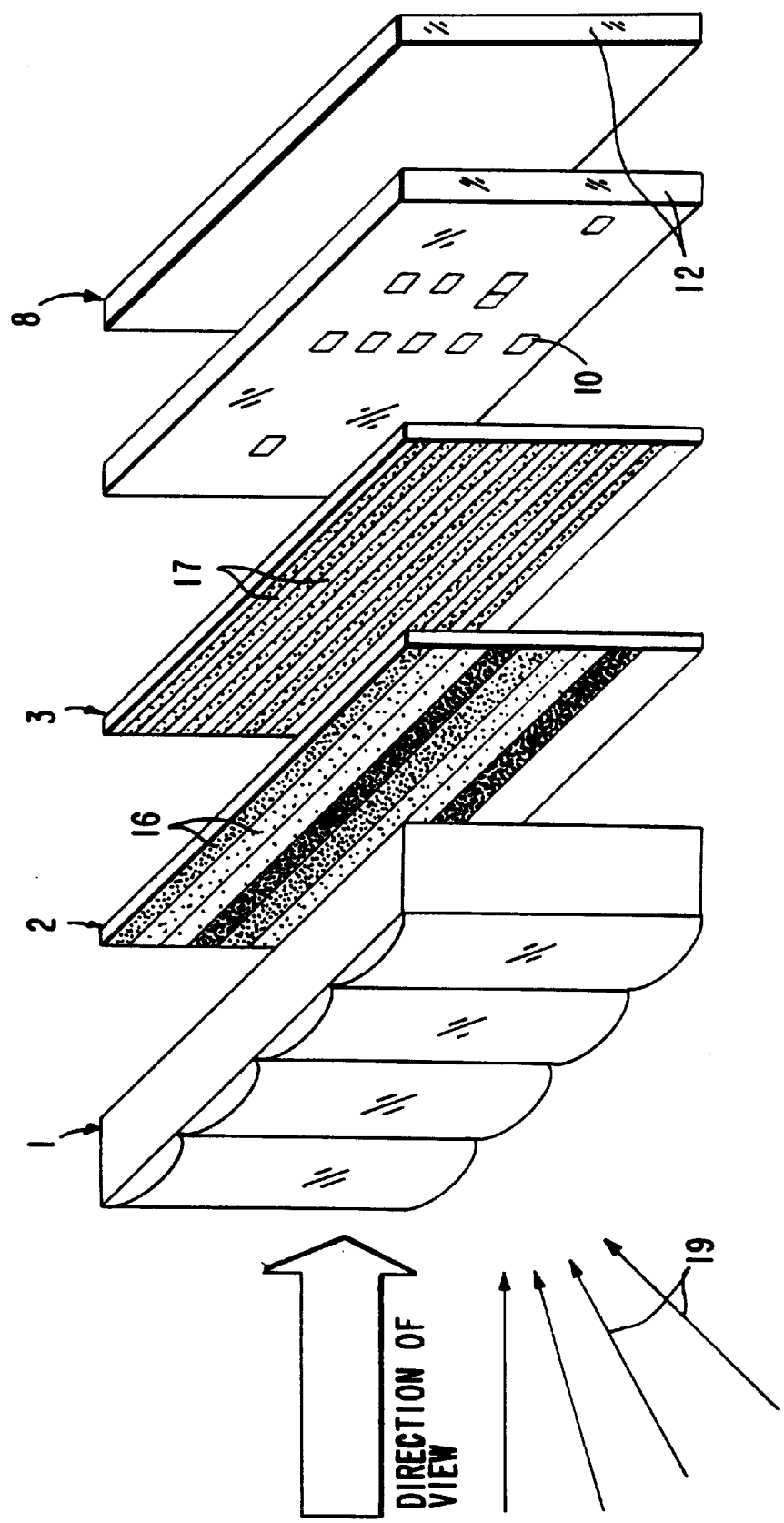
FIG. 2 is a view showing a stereo-hologram viewing apparatus.

As already mentioned in the formulation of the problem the scatter display should also be capable of being replaced by a film. However black and white films of this size and resolution are to be had inexpensively. Only mounting to micrometer precision has to be considered. This can however be ensured in that film is fixed on a glass plate or is tensioned in a fine hole matrix. FIG. 2 shows such a stereo-hologram viewing apparatus, in which (7) denotes the film or the film plate and (8) denotes the illumination box with uniformly dispersed light. (7) consists of a glass plate with a standard black and white film, which is applied to the front side of the glass plate. The resolution amounts to 3200 dpi. With a pixel size of about 8×8 $\mu m^2$ a digital information content of about 180 Mbyte results. The sequence of the colour and brightness masks can be interchanged with the film plate (7). It is merely important that the focal lines of the cylindrical lenses lie in both cases on the thin film layer. The further elements in FIG. 2 are (1) a lens raster plate with 1024 cylindrical lenses, (2) a colour strip mask (RGBS) with a strip height of 80 $\mu m$ and a pitch height of 0.32 mm and (3) a grey strip code mask with an individual strip height of 8 $\mu m$. These three elements are identical with those in FIG. 1.

The foci of lenses are dependent among other things slightly on the wavelength of the light. However the three colours R, G and B are spatially separated in accordance with the colour strips on the mask. This has the advantage that the focal length can be corrected by slightly different thicknesses of glass.

A vertical section through the scatter display is shown in FIG. 3a). The smallest binary controllable pixel size amounts to 4 $\mu m \times 8$ $\mu m$. (13) represents the beam direction of the white light and (14) the laser beam write direction. An enlarged colour structure is shown in FIG. 3b), in which the horizontal steps lie in the direction of view. The means 9 can be black strip/absorbing light or strips reflecting light respectively.

Description of the Field of Use for the Stereo-Hologram Display

The stereo-hologram display (3D-display) represents article or landscapes three-dimensionally. It is possible to represent more than 80 different views of a three-dimensional article with a cylindrical lens width of 0.5 mm. All these perspectives of the article can be made visible, i.e. be viewed through lateral movement of the observing head. The views are as a rule computed by a computer. Accordingly there is the possibility also to represent related views which do not occur in nature. For example the outside of an article can be shown up to a certain angle of view and then the inside. Dynamic presentation possibilities also arise on a single stereo-hologram. For example an article can be displayed such that when the viewers make a small movement to the right, an article appearing in front of the display rotates to the left. Thus a bone fracture can be observed three-dimensionally and all round for example. The most important field of use will therefore be in radiology in medical technology; a few minutes after the X-ray exposure the results can be seen three-dimensionally on the display and be retained as long as desired. Parallel to this the same hologram can be stored on a film, i.e. preserved for later.

A further field of interest is in advertising, since the attention of the eyes can be diverted—even unconsciously—to an object by unusual effects which do not occur in nature.

With creation of still larger displays architecture will be an important field of application, since interactive buildings and landscapes appearing three-dimensionally can be formed, because sections only of the display can be reset and rewritten in altered form. This feature will also be welcomed in creative arts.

It is however also conceivable for 3D studios to be established, which offer three-dimensional colour portraits with computer assistance, which can be selected from several test exposures without appreciable waiting time. Even if up to 100 individual perspectives are shown it is not necessary that 100 exposures are also made in this case. The intermediate perspectives can be interpolated from two or four exposures which are made simultaneously from different directions with high resolution cameras. Since the actual information is filed purely in binary form, materials still cheaper than film can be used. A wafer-thin absorption layer can be selectively vaporised locally by laser power.

LITERATURE

[1] R. Börner: Autostereoscopic 3-D Imaging by Front and Rear Projection and on Flat Panel Displays. Displays, Vol. 14, No. 1 (1993), pp. 39–46.

[2] Lee; Sung: Recording and Reproducing a 3-Dimensional Image. Internationale Patent Application, PCT Int. Publ. No. WO9222989, Int. Class. HO4N 13/00.15/00.9/31 G03B 35/08.35/20.35/74, Publ. Date: December 1992.

[3] S. Hentschke: Stereoskoper Bildschirm. [Stereoscopic display screen] Patent application P 41 14 023.0 (1991).

[4] A. Tschudi, M. Kreuzer: Laseradressierbares Projektionsdisplay. [laser-addressable projection display] CeBIT Brochure Hessischer Hochschulen 1995.

[5] H. P. Mainzer, K. Meetz, D. Scheppelmann, U. Engelmann, H. J. Bauer. The Heidelberg Ray Tracing Model. IEEE Computer Graphics and Appl. November 1991 pp. 34ff.

[6] S. Hentschke, A. Herrfeld, C. Junge, J. Kothe: Personenadaptive stereoskope Bildver-arbeitung. [Person-adaptive stereoscopic image processing] CeBIT-Exponat, Brochure Hessischer Hochschulen, (1995).

[7] R. Börner: Autostereoskope Rückprojektions-und Flachbildschirme. [Auto-stereoscopic rear projection and flat display display screen] Fernseh und Kinotechnik Vol. 48, No. 11 (1994). pp.594–600.

[8] S. Hentschke: Personenadaptiver autostereoskoper Monitor—eine Option für den Fernseher? [Person-adaptive auto-stereoscopic monitor—an option for the television viewer?] Fernseh-und Kinotechnische Zeitschrift No.5/1996, pp. 242–248.

[9] R. Börner: Wiedergabeeinrichtung für dreidimensionale Wahrnehmung von Bildern. Autostereoscopic Viewing Device for Creating Three Dimensional Perception of Images. German Patent No. DE 3921061-A1. (Appn. 1989).

[10] Verhulst, A. G.: Display and pick-up device for stereoscopic picture display: European Patent 0 332 268 (1988).

[11] S. Hentschke: Personenadaptiver autostereoskoper Shutter Bildschirm [Person-adaptive auto-stereoscopic shutter display screen] (PAAS). Patent specification DE 195 00 315 C, (1995).

[12] M. Kreuzer, T. Tschudi, W. de Jeu, R- Eidenschink: A new bistable liquid crystal display with bistability and selective erasure using scattering in filled nematics. Appl. Phys. Letters 62, 1712–14, (1993).

What is claimed is:

1. A 3D-display, comprising a lens raster plate (1) with vertically disposed cylindrical lenses, a color mask (2), a brightness mask (3) and a micro-display (4, 7) having binary coded micro-fields (10) with a magnitude of a few $\mu m^2$, said vertical lenses having foci being located on said micro-display (4, 7), said micro-fields (10) being determined from a computer for correct perspective views, and a binary code for said micro-fields (10) being selected from a group of codes including transparent or absorbing, transparent or scattering, bright or dark and horizontally or vertically polarised fields.

2. A 3D-display as defined in claim 1, wherein said color mask (2) has horizontal color strips (16), and behind each of said color strips (16) a brightness-coded strip (17) of said brightness mask (3) being arranged which brightness-coded strip (17) is subdivided into horizontal brightness sub-strips (18) having different coefficients of transmission of light, said micro-fields (10) each lying within one of said brightness sub-strips said micro-fields (10) arranged one over the other within a respective one of said color strips (16) being so selected than amplitude of light transmitted through said respective color strip in summary corresponds to a desired brightness step.

3. A 3D-display as defined in claim 2, wherein said brightness sub-strips (18) have coefficients of transmission of light which differ in powers of two for the amplitude.

4. A 3D-display as defined in claim 2, wherein said color strips (16) have color transition zones and middle portions therebetween, said brightness sub-strips (18) being so placed that darker light-transmitting sub-strips are located nearer said color transition zones whereas brighter light-transmitting zones are located nearer said middle portions.

5. A 3D-display as defined in claim 1, wherein said micro-display is an LC scatter display (4), is illuminated with light rays passing through it from the rear and with an oblique direction and has means (9) to reflect or absorb said light rays.

6. A 3D-display as defined in claim 5, wherein said scatter display (4) is illuminated from the front instead of from the rear, and an absorbing surface being arranged behind said scatter display (4).

7. A 3D-display as defined in claim 1, wherein said micro-display is a photo display including a binary written film (7) having a binary 3D-pattern thereon and an illumination surface (8) on a rear side thereof.

8. A 3D-display as defined in claim 7, and being illuminated from a front instead of from a rear, wherein said illumination surface (8) is a white, dispersive reflecting layer (8).

* * * * *